United States Patent
Sugimoto et al.

(10) Patent No.: US 7,591,339 B2
(45) Date of Patent: Sep. 22, 2009

(54) DRIVING-FORCE CONTROL APPARATUS AND METHOD FOR VEHICLE

(75) Inventors: Tomonaga Sugimoto, Kanagawa (JP); Hatsuki Morinaga, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 413 days.

(21) Appl. No.: 11/362,013

(22) Filed: Feb. 27, 2006

(65) Prior Publication Data
US 2006/0196714 A1 Sep. 7, 2006

(30) Foreign Application Priority Data
Mar. 4, 2005 (JP) .............................. 2005-061297
Oct. 24, 2005 (JP) .............................. 2005-308080

(51) Int. Cl.
*B60K 23/04* (2006.01)
(52) U.S. Cl. ...................................... 180/242; 180/6.24
(58) Field of Classification Search ................ 180/242, 180/6.24–6.4
See application file for complete search history.

(56) References Cited

U.S. PATENT DOCUMENTS 6,059,064 A * 5/2000 Nagano et al. .............. 180/243
6,349,782 B1 * 2/2002 Sekiya et al. .............. 180/65.2
2003/0060948 A1 * 3/2003 Yamaguchi et al. ........... 701/22
2004/0135527 A1 7/2004 Tatara et al.

FOREIGN PATENT DOCUMENTS

JP 2004-189067 A 7/2004
JP 2004-222413 A 8/2004

* cited by examiner

*Primary Examiner*—Kevin Hurley
(74) *Attorney, Agent, or Firm*—Foley & Lardner LLP

(57) ABSTRACT

A driving-force distribution control apparatus for a vehicle includes a first motor adapted to drive one of front wheels and rear wheels, as main drive wheels; a second motor adapted to drive another of the front wheels and the rear wheels, as auxiliary drive wheels; an engine adapted to drive the main drive wheels; a battery connected electrically with the first motor and the second motor; an upper-limit output setting section configured to set an upper limit output of the battery in accordance with a charge state of the battery; and a driving-force distribution control section. This driving-force distribution control section is configured to control an output of the first motor and an output of the second motor in accordance with a running condition of the vehicle, to bring a steer characteristic of the vehicle closer to a neutral steer. Moreover, the driving-force distribution control section is configured to impose an output limitation on only the first motor between the first motor and the second motor, when a desired total output of the first motor and the second motor becomes greater than the upper limit output of the battery.

15 Claims, 9 Drawing Sheets

DRIVING-FORCE CONTROL APPARATUS AND METHOD FOR VEHICLE

BACKGROUND OF THE INVENTION

The present invention relates to apparatus and/or method for controlling a distribution of driving force of a vehicle having an engine, a first motor, and a second motor.

Japanese Patent Application Publication No. 2004-222413 (patent document D1) discloses a hybrid four-wheel-drive vehicle equipped with an engine, a first motor mechanically coupled with the engine and front wheels and electrically coupled with a battery, and a second motor mechanically coupled with rear wheels and electrically coupled with the battery.

Moreover, Japanese Patent Application Publication No. 2004-189067 (patent document D2) discloses a (non-hybrid) four-wheel-drive vehicle in which front-to-rear distribution ratio and left-to-right distribution ratio of rear wheels are controlled in order to achieve a neutral steer. In this technique, the front-to-rear distribution ratio is continuously varied in the range between 30:70 and 70:30, and the left-to-right distribution ratio of rear wheels is continuously varied in the range between 100:0 and 0:100.

SUMMARY OF THE INVENTION

However, if the technique for the driving-force distribution disclosed in patent document D2 tries to be applied to the hybrid four-wheel-drive vehicle disclosed in patent document D1, there is a following possibility. Namely, when driving the first and second motors in order to achieve the neutral steer, an input/output limit value set based on a characteristic of the battery is applied to both of first and second motors in common. This is since the vehicle has the single battery for driving these motors. Accordingly, an output limitation is imposed on both of first and second motors, when a remaining amount of the battery is reduced. In the case of a hybrid four-wheel-drive vehicle using front wheels as main drive wheels, the driving force of rear-and-outer wheel needed to achieve the neutral steer is reduced. Hence, an understeer is caused.

It is an object of the present invention to provide driving-force distribution control apparatus and method for a vehicle, devised to improve a running/operating stability when the vehicle is turning.

According to one aspect of the present invention, there is provided a driving-force distribution control apparatus for a vehicle, comprising: a first motor adapted to drive one of front wheels and rear wheels, as main drive wheels; a second motor adapted to drive another of the front wheels and the rear wheels, as auxiliary drive wheels; an engine adapted to drive the main drive wheels; a battery connected electrically with the first motor and the second motor; an upper-limit output setting section configured to set an upper limit output of the battery in accordance with a charge state of the battery; and a driving-force distribution control section configured to control an output of the first motor and an output of the second motor in accordance with a running condition of the vehicle, to bring a steer characteristic of the vehicle closer to a neutral steer, and to impose an output limitation on only the first motor between the first motor and the second motor, when a total output of the first motor and the second motor becomes greater than the upper limit output of the battery.

According to another aspect of the present invention, there is provided a driving-force distribution control apparatus for a vehicle, comprising: first drive means for driving one of front wheels and rear wheels, as main drive wheels; second drive means for driving another of the front wheels and the rear wheels, as auxiliary drive wheels; an engine for driving the main drive wheels; a battery connected electrically with the first drive means and the second drive means; upper-limit output setting means for setting an upper limit output of the battery in accordance with a charge state of the battery; and driving-force distribution control means for controlling an output of the first drive means and an output of the second drive means in accordance with a running condition of the vehicle, to bring a steer characteristic of the vehicle closer to a neutral steer, and imposing an output limitation on only the first drive means between the first drive means and the second drive means, when a desired total output of the first drive means and the second drive means becomes greater than the upper limit output of the battery.

According to still another aspect of the present invention, there is provided a driving-force distribution control method for a vehicle equipped with a first motor adapted to drive one of front wheels and rear wheels, as main drive wheels; a second motor adapted to drive another of the front wheels and the rear wheels, as auxiliary drive wheels; and a battery connected electrically with the first motor and the second motor, the driving-force distribution control method comprising: setting an upper limit output of the battery in accordance with a charge state of the battery; controlling an output of the first motor and an output of the second motor in accordance with a running condition of the vehicle, to bring a steer characteristic of the vehicle closer to a neutral steer; and imposing an output limitation on only the first motor between the first motor and the second motor, when a desired total output of the first motor and the second motor becomes greater than the upper limit output of the battery.

The other objects and features of this invention will become understood from the following description with reference to the accompanying drawings.

DETAILED DESCRIPTION OF THE INVENTION

Reference will hereinafter be made to the drawings in order to facilitate a better understanding of the present invention.

First Embodiment

Figure 1:
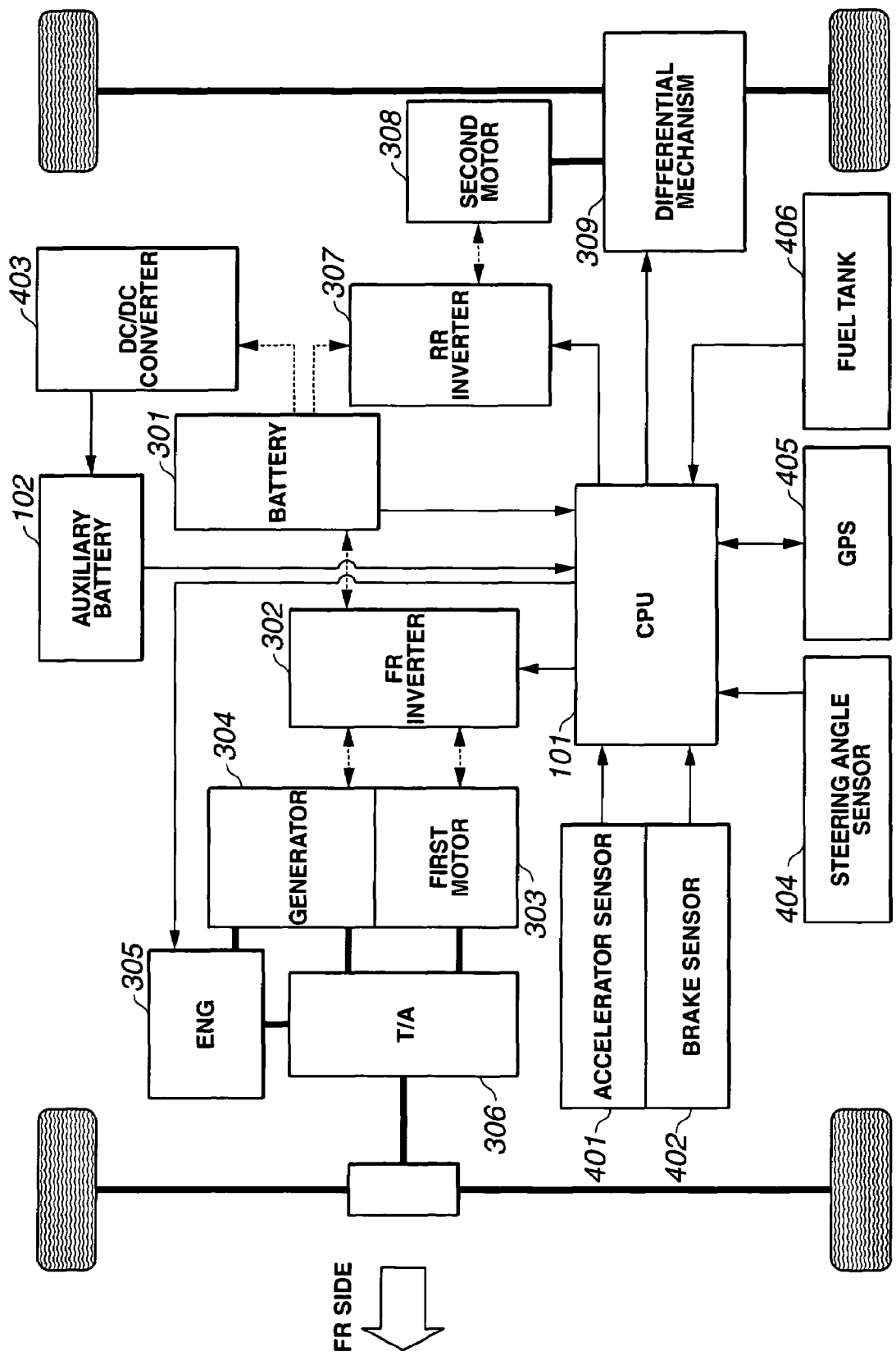
FIG. 1 is a schematic block diagram showing a system configuration of hybrid four-wheel-drive vehicle employing a driving-force distribution control apparatus of a first embodiment according to the present invention.

At first, a configuration of a first embodiment according to the present invention will now be explained. FIG. 1 is a schematic block diagram showing a hybrid four-wheel-drive vehicle employing a driving-force distribution control apparatus of the first embodiment according to the present invention. The hybrid four-wheel-drive vehicle in the first embodiment includes a CPU (central processing unit) 101, an auxiliary battery 102, a battery (strong battery or highly chargeable battery) 301, a FR inverter 302, a first motor(/generator) 303, a generator 304, an engine 305, a power dividing mechanism 306, a RR inverter 307, a second motor (/generator) 308, a differential mechanism (driving-force dividing mechanism for left and right road wheels) 309, an accelerator sensor 401, a brake sensor 402, a DC-DC converter 403, a steering angle sensor 404, a GPS (topography information gathering section) 405, and a fuel tank 406, as shown in FIG. 1.

CPU 101 is configured to calculate a possible input/output electric energy according to a temperature, a SOC (state of charge), and a deterioration state of battery 301, by monitoring battery 301. Then, CPU 101 operates first motor 303 (for driving front wheels) and generator 304 by controlling FR inverter 302 on the basis of the calculated possible input/output electric energy, and controls engine 305. Moreover, CPU 101 operates second motor 308 (for driving rear wheels) by controlling RR inverter 307, and sends a torque distribution command for left and right wheels to differential mechanism 309. Thereby, CPU 101 performs a driving-force distribution (division) control for front wheels and rear wheels and a driving-force distribution control for left wheel and right wheel of the rear wheels, to bring a steer characteristic of the vehicle closer to a neutral steer. Furthermore, CPU11 determines whether or not the vehicle is turning (cornering) on the basis of a sensed value derived from steering angle sensor 404. CPU 101 recognizes a driving route of the vehicle, by using topography information gathered by GPS 405.

Auxiliary battery 102 provides a power source for CPU 101. In this embodiment, DC-DC converter 403 supplies power to auxiliary battery 102, by using battery 301 as a power source.

Battery 301 is electrically connected with first motor 303 and second motor 308. Battery 301 is configured to supply electric power to first motor 303 through FR inverter 302 so as to give assistance for a vehicle running. Battery 301 also receives electric power generated by generator 304, through FR inverter 302. Moreover when second motor 308 does a power running, battery 301 supplies electric power to second motor 308 through RR inverter 307 so as to give assistance for the vehicle running. Battery 301 also receives electric power from second motor 308 through RR inverter 307, when second motor 308 generates the electric power.

FR inverter 302 is directly controlled by CPU 101. FR inverter 302 is configured to supply electrical energy of battery 301 to first motor 303 in accordance with a torque and a rotation speed produced by engine 305. Moreover, FR inverter 302 returns electrical energy generated by operating generator 304 to battery 301. Since respective first motor 303, generator 304, and engine 305 are directly connected with a planetary gear unit or mechanism (installed in power dividing mechanism 306), these first motor 303, generator 304, and engine 305 are controlled so as to keep a torque balance and a rotation speed balance thereof. If not so, the vehicle cannot be operated properly.

First motor 303 for driving front wheels produces a driving torque single-handedly, in the case where a vehicle speed is relatively low. In the case where the vehicle speed is relatively high, first motor 303 gives assistance to driving torque of engine 305. Moreover, first motor 303 produces electric energy while the vehicle is decelerating, by its power-generation action (regenerative action). Then, first motor 303 returns this generated electric energy to battery 301 via FR inverter 302. Additionally, in this embodiment, the rotation speed of first motor 303 is defined as the vehicle speed (first motor 303's speed =vehicle's speed).

In general, a hybrid electric vehicle does not have a starter. When the vehicle of this embodiment starts engine 305; battery 301 supplies electric power to generator 304, and generator 304 supports the engine start by serving as a motor. When the vehicle is running under a normal condition; generator 304 generates electric energy by keeping a balance between first motor 303 and engine 305, and then returns the generated electric energy to battery 301. Also, generator 304 can supply the electric power directly to first motor 303 so as to support a rapid acceleration of the vehicle.

Engine 305 is directly controlled by CPU 101. Concretely, engine 305 drives front wheels through power dividing mechanism 306, and produces the torque for driving the vehicle in the case where the vehicle speed is relatively high.

Power dividing mechanism 306 includes the planetary gear mechanism having a carrier connected directly with engine 305, a ring gear connected directly with first motor 303, and a sun gear connected directly with generator 304. Power dividing mechanism 306 also includes a unit corresponding to so-called transmission in earlier technology.

RR inverter 307 is directly controlled by CPU 101. RR inverter 307 is configured to supply electric energy from battery 301 or absorb electric energy to battery 301 (i.e., charges battery 301), in accordance with torque and rotation speed produced by second motor 308. Moreover, RR inverter 307 includes a temperature sensor, and sends values sensed by the temperature sensor to CPU 101. This temperature sensor is used for imposing an input/output limitation of electric power at the time of increase of the temperature (i.e., for the sake of parts protection).

Second motor 308 for driving rear wheels serves to function as 4 WD vehicle, when the vehicle is in normal running condition. Namely, second motor 308 drives rear wheels as auxiliary drive wheels of 4 WD vehicle. When the vehicle is turning; second motor 308 produces torque according to an increase of running course due to a difference between turning-radiuses formed by inner wheels, so as to improve a running stability and an operation stability.

Differential mechanism (or gear unit) 309 is connected with the rear wheels. Differential mechanism 309 is configured to distribute (or divide) torque produced by second motor 308 to left and right wheels. Namely differential mechanism 309 is capable of dividing the driving force produced by second motor 308, between the left and right wheels at a substantially arbitrary distribution ratio. Concretely, differential mechanism 309 includes a speed increasing mechanism (or gear train), a right-side clutch, and a left-side clutch in addition to a normal differential mechanism, to become capable of distributing torque appropriately between left and right wheels. Differential mechanism 309 controls such a torque distribution in response to a command from CPU 101. It is noted that differential mechanism 309 corresponds to a driving-force dividing mechanism according to the present invention.

Accelerator sensor (acceleration stroke sensor) 401 sends a stroke quantity signal of an accelerator pedal (i.e., driver's manipulated variable) to CPU 101, when a driver depresses the accelerator pedal at the time of acceleration of the vehicle.

Brake sensor 402 sends a stroke quantity signal of a brake pedal (i.e., driver's manipulated variable) to CPU 101, when the driver depresses the brake pedal at the time of deceleration of the vehicle.

DC/DC converter 403 transforms the energy derived from battery 301 to 12 volt, and supplies the transformed energy to auxiliary battery 102. Namely, DC/DC converter 403 is configured to function as an alternator mounted in an engine-drive vehicle of earlier technology.

Steering angle sensor 404 for sensing a steering angle of steering wheel manipulated by the driver sends a signal of the sensed steering angle (i.e., driver's manipulated variable) to CPU 101.

GPS (global positioning system) 405 extracts or detects a degree of turning radius, a degree of inclination, and an estimated friction coefficient of road surface, with respect to each corner existing before a desired destination. Then GPS 405 provides the extracted information to CPU 101.

Fuel tank 406 serves to store a liquid fuel. Moreover, fuel tank 406 senses a remaining amount of the fuel, and sends the sensed information to CPU 101.

Next, operations of the first embodiment will now be explained.

[Process of Driving-Force Distribution Control]

Figure 2:
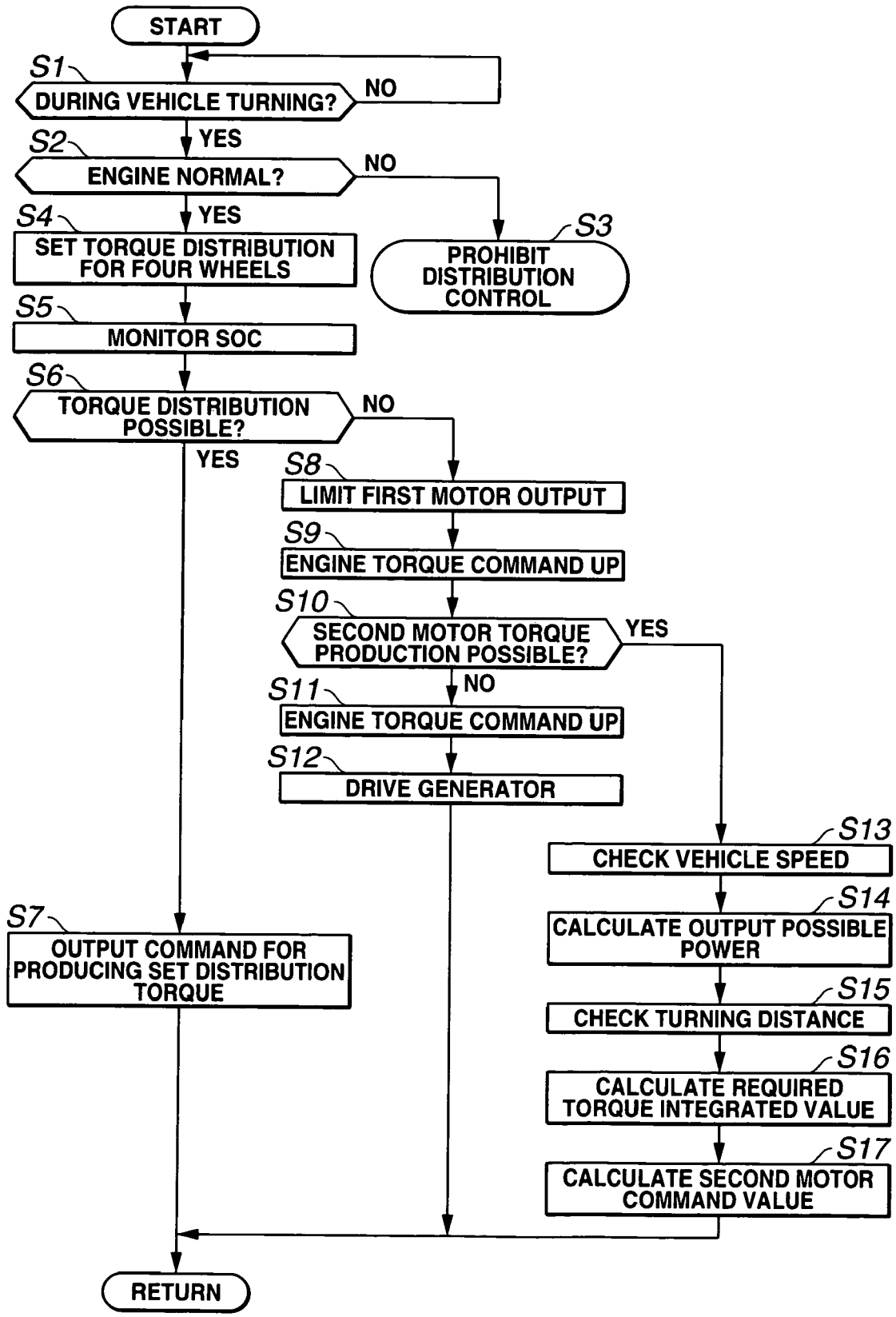
FIG. 2 is a flowchart showing a control process of driving-force distribution control which is executed in a CPU in the first embodiment.

FIG. 2 is a flowchart showing a process of the distribution control of driving force which is executed in CPU 101 in the first embodiment. Respective steps (a driving-force distribution control section or means) of this flowchart will now be explained.

At step S1, the controller (CPU 101) judges whether or not the vehicle is turning. In other words, the controller judges whether or not the vehicle is in a turning state. If the answer of step S1 is YES, the program proceeds to step S2. If the answer of step S1 is NO, the program returns to step S1. Here more specifically, the controller determines that the vehicle is turning, in the case where the (absolute) value sensed by steering angle sensor 404 is greater than a predetermined value.

At step S2 subsequent to the determination of YES at step S1, the controller judges whether or not engine 305 works properly (normally). In other words, the controller judges whether or not engine 305 is in a properly operating state, at step S2. If the answer of step S2 is YES, the program proceeds to step S4. If the answer of step S2 is NO, the program proceeds to step S3. Here more specifically, the controller judges whether or not engine 305 works properly, for example by judging whether or not an engine speed sensor detects the engine speed (greater than 0). Namely, the controller determines that engine 305 is in a failed state in the case where the engine speed sensor senses no engine speed.

At step S3 subsequent to the determination of NO at step S2, the controller prohibits the driving-force distribution control of this embodiment. Then, the program proceeds to an end. It is noted that the flow of step S2→step S3 corresponds to a driving-force distribution control prohibiting section. Here more specifically, the controller prohibits the driving-force distribution control; by prohibiting an output limitation for second motor 308 and limiting the output of first motor 303 to equal to 0, and thereby switching the vehicle to a rear-wheel-drive vehicle only using second motor 308 as a drive source. In other words, the controller distributes driving force to only the auxiliary drive wheels between the main drive wheels and the auxiliary drive wheels, when the engine trouble occurs.

Figure 3:
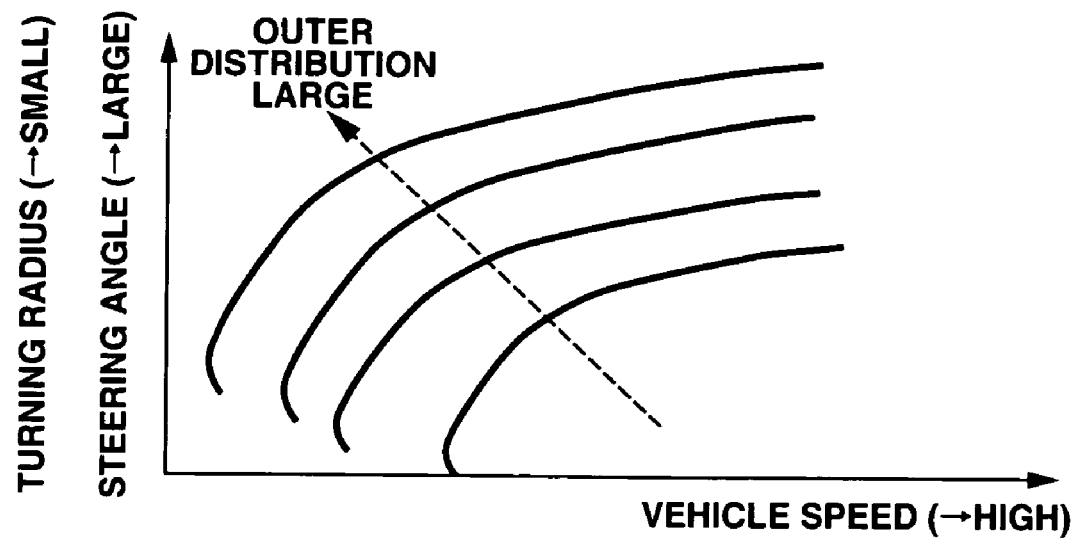
FIG. 3 is a view showing one example of left-to-right torque distribution setting map for rear wheels which is used in the first embodiment.

At step S4 subsequent to the determination of YES of step S2, the controller sets a desired torque distribution (amount or ratio) for each of four wheels, in accordance with a running condition such as the vehicle speed V recognized from first motor 303's speed and the turning radius R recognized from steering angle sensor 404. Then, the program proceeds to step S5. Here more specifically, the desired torque distribution for four wheels includes a "torque distribution for front and rear wheels" and a "torque distribution for left and right wheels of rear wheels". The "torque distribution for front and rear wheels" is set, for example to allow torque of rear wheels to be more increased as turning radius R becomes smaller (i.e., the steering angle becomes larger) and vehicle speed V becomes higher. The "torque distribution for left and right wheels of rear wheels" is set, for example to allow torque of an (turning-)outer wheel to be more increased as turning radius R becomes smaller and vehicle speed V becomes higher, as shown in FIG. 3. It is noted that such a map shown in FIG. 3 has taken the following characteristic into consideration. Namely, the difference between turning radiuses formed by inner wheels of the vehicle is greater as the steering angle becomes larger, and smaller as vehicle speed V becomes higher.

At step S5 subsequent to the setting of step S4, the controller checks the SOC (state of charge) of battery 301 and a battery 301's temperature, in order to judge whether or not the remaining quantity of battery 301 needed to produce the desired torque set at step S4 exists. Then, the program proceeds to step S6.

At step S6 subsequent to the monitoring of SOC of battery 301 at step S5, the controller judges whether or not the desired driving-force distribution can be realized (performed). If the answer of step S6 is YES, the program proceeds to step S7. If the answer of step S6 is NO, the program proceeds to step S8. Here more specifically, the controller determines that the desired driving-force distribution can be realized, in the case where a total output power of first motor 303 and second motor 308 needed to produce the desired torque distribution for four wheels is equal to or lower than an upper-limit output power of battery 301. On the other hand, the controller determines that the desired driving-force distribution cannot be realized, in the case where the total output power of first motor 303 and second motor 308 exceeds the upper-limit output power of battery 301. This upper-limit output power is set in accordance with SOC and temperature of battery 301. It is noted that this setting corresponds to an upper-limit (battery) output setting section or means according to the present invention.

At step S7 subsequent to the determination of YES of step S6, the controller outputs a control command capable of producing the distribution torque for each of four wheels set at step S4. Then, the program proceeds to a return. Here more specifically, the controller outputs a control command for the setting of front-to-rear distribution torques to FR inverter 302 and RR inverter 307, and then outputs a control command for the setting of left-to-right distribution torques for rear wheels to differential mechanism 309.

At step S8 subsequent to the determination of NO of step S6, the controller limits an output power to first motor 303 (or, limits an output power of first motor 303). Then, the program proceeds to step S9. Here more specifically, the controller sets an input limit value of first motor 303 (or, sets an output limit value of first motor 303) so as to become lower than usual, in response to the determination that an energy supplement (addition) is necessary. Thereby, a quantity of energy supply to be delivered from battery 301 to second motor 308 is secured.

At step S9, the controller corrects output torque of engine 305 so as to become more increased, in order to compensate for an output reduction of first motor 303 due to the output limitation imposed at step S8. Namely, the controller corrects a torque command for engine 305.

At step S10 subsequent to the increase of engine torque command at step S9, the controller judges whether or not the set desired distribution torque of second motor 308 can be produced, in accordance with current energy amount of battery 301. In other words, the controller judges whether or not second motor 308's torque satisfying the distribution command for producing the desired distribution torque of second motor 308 can be realized, with reference to the current remaining amount (i.e., current upper-limit output) of battery 301. If the answer of step S10 is YES, the program proceeds to step S13. If the answer of step S10 is NO, the program proceeds to step S11.

At step S11 subsequent to the determination of NO of step S10, the controller outputs a command for increasing the torque of engine 305 to engine 305. Then the program proceeds to step S12. Here more specifically, the controller outputs a command for increasing the engine 305's torque for driving generator 304, to e.g. a control throttle unit of engine 305, so as to obtain an energy just covering the shortage of energy (i.e., so as to obtain same energy amount as the energy shortage of battery 301) by the power generation of generator 304.

At step S12 subsequent to the increase of engine torque command of step S11, the controller allows engine 305 to drive generator 304. Then, the program proceeds to the return. Specifically, second motor 308 produces driving torque for rear wheels by receiving the electric energy generated by the increase of engine torque command, and outputs a command for producing the desired distribution torque for each of left and right rear wheels to differential mechanism 309. It is noted that second motor 308 may receive an energy produced by the power generation of first motor 303, in order to meet various systems. Namely, the controller may increase the engine output to allow first motor 303 to generate the electric energy corresponding to a difference between the desired output of second motor 308 and the upper-limit output of battery 301, when the desired output of second motor 308 becomes greater than the upper limit output of battery 301 in the case where only second motor 308 between first motor 303 and second motor 308 does a power running as the result of the output limitation on first motor 303. Additionally, steps 9-12 correspond to an engine output correcting section according to the present invention.

At step S13 subsequent to the determination of YES of step S10, the controller checks or detects the speed of first motor 303 (=vehicle speed). Then, the program proceeds to step S14.

Figure 4:
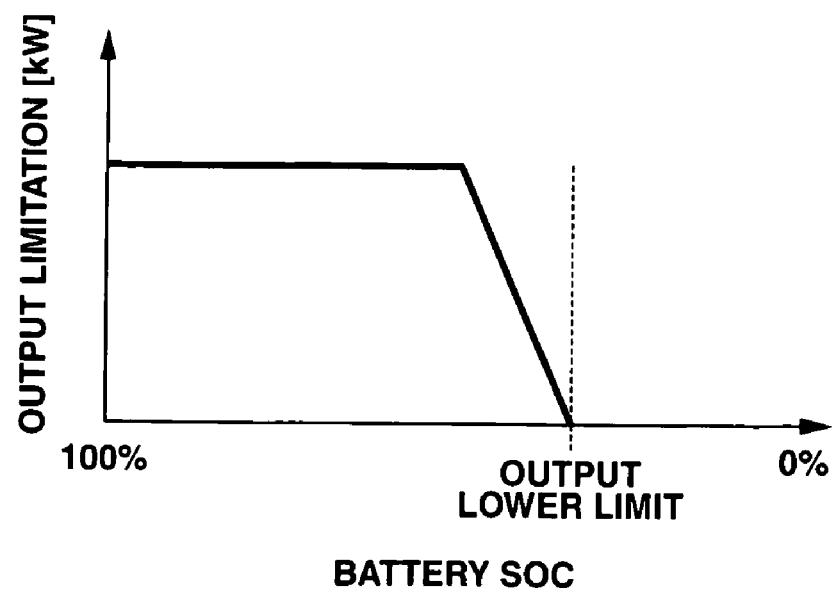
FIG. 4 is a view showing one example of output limitation setting map relative to a battery SOC which is used in the first embodiment.
Figure 5:
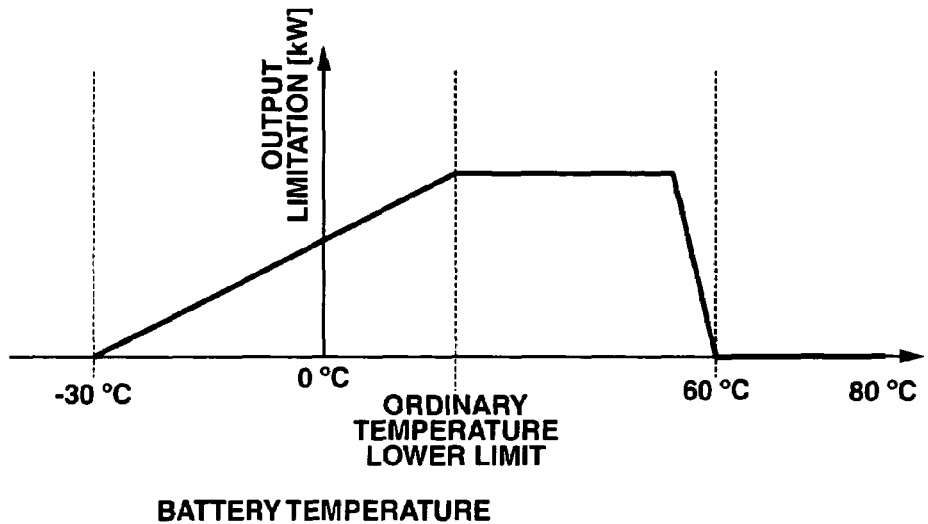
FIG. 5 is a view showing one example of output limitation setting map relative to a battery temperature which is used in the first embodiment.

At step S14 subsequent to the check of the vehicle speed at step S13, the controller calculates an output possible power (or the current upper-limit output power) of battery 301. Then, the program proceeds to step S15. Here, the output possible power is set by selecting a lower one of the following two values. Namely, the first value is an output power limit value obtained by looking up an output limitation setting map relative to the battery SOC as shown in FIG. 4, and the second value is an output power limit value obtained by looking up an output limitation setting map relative to the battery temperature as shown in FIG. 5. In addition, generally, a hybrid vehicle is controlled within the SOC range e.g. between 40 and 80% not between 0 and 100%, when looking up the output limitation setting map relative to the battery SOC shown in FIG. 4. Namely, when the battery SOC reaches its control lower limit value, an output limitation 0 kW (=output prohibition) is generally imposed on the battery so as not to allow the battery SOC to become lower than the control lower limit value. In addition, the output limitation setting map relative to the battery temperature of FIG. 5 shows a general characteristic, in which the output power limit values of the battery are predetermined in the temperature range between a lower limit of room (ordinary) temperature and a lower limit (e.g., −30 °C.) of warranty temperature, and the temperature range in proximity to an upper limit (e.g., 60°C.) of warranty temperature, with a performance deterioration and an output characteristic of the battery taken into consideration. It is noted that step S14 also corresponds to the upper-limit (battery) output setting section according to the present invention.

At step S15 subsequent to the calculation of the output possible power at step S14, the controller checks (calculates) a continuation distance of each corner to which the driving-force distribution control of this embodiment should be applied, by retrieving the driving route of vehicle by using GPS 405. Namely, the controller checks the distance during which each corner continues (i.e., length of each corner measured along corner's shape) by using GPS 405. Then, the program proceeds to step S16.

At step S16 subsequent to the check of the turning distance of step S15, the controller calculates a required torque integrated value (=continuous output possible power) in accordance with the vehicle speed checked at step S13, the output possible power calculated at step S14, and the continuation distance of corner checked at step S15. Then, the program proceeds to step S17. This required torque integrated value is calculated from the following relation.

Required torque integrated value=(Output possible power)/{(Continuation distance)/(Vehicle speed)}

At step S17 subsequent to the calculation of the required torque integrated value at step S16, the controller sets the calculated required torque integrated value (=continuous output possible power) as an output command value for second motor 308 operating on the corresponding corner. Then, the program proceeds to the return. For example, if the (desired) output of second motor 308 is smaller than or equal to the upper-limit output of battery 301 in the case where only second motor 308 between first motor 303 and the second motor 308 does the power running as the result of the output limitation on first motor 303, the controller outputs a command for producing the calculated required torque integrated value to second motor 308.

[Flow of Driving-Force Distribution Control]

In the case where the vehicle is in a turning state, engine 305 is in a properly operating state, and the desired torque distribution can be realized; a flow proceeding as step S1→step S2→step S4→step S5→step S6→step S7 in the flowchart of FIG. 2 is continued. At step S7, the controller carries out the driving-force distribution for front and rear wheels and for left and right wheels of rear wheels to achieve the neutral steer, by carrying out the output control for engine 305, first motor 303, and second motor 308, and by carrying out the distribution-ratio control for differential mechanism 309.

In the case where the vehicle is in a turning state, engine 305 is in a properly operating state, and the desired torque distribution cannot be realized; a flow proceeds as step S1→step S2→step S4→step S5→step S6→step S8 in the flowchart of FIG. 2. At step S8, the controller brings the output limit value of first motor 303 to a lower value (including 0 at which only second motor 308 between first motor 303 and second motor 308 does the power running), so as to secure the quantity of energy supply to be supplied to second motor 308 from battery 301.

Then, if the second motor 308's torque satisfying the (desired) distribution command cannot be produced, with the remaining energy amount of battery 301. taken into consideration; a flow proceeding as step S8→step S9→step S10→step S11→step S12 in the flowchart of FIG. 2 is continued. At step S11, the controller outputs a command for increasing the engine torque. At step S12, generator 304 is driven by engine 305. In sum, generator 304 generates so as to cover the shortage of energy to produce the desired second motor 308's torque. Then by using this generated energy, the controller produces the driving torque for rear wheels which satisfies the distribution command. Moreover, the controller outputs a command for achieving the distribution torques of left and right rear wheels (i.e., achieving left-to-right distribution ratio for rear wheels) to differential mechanism 309.

If the second motor 308's torque satisfying the distribution command can be produced with the remaining energy amount of battery 301 taken into consideration; a flow proceeding as step S8→step S9→step S10→step S13→step S14→step S15→step S16→step S17 in the flowchart of FIG. 2 is continued. At step S16, the controller calculates the required torque integrated value in accordance with the vehicle speed detected at step S13, the output possible power calculated at step S14, and the continuation distance of corner checked at step S15. At step S17, the controller sets the calculated required torque integrated value (=continuous output possible power) as the output command value for second motor 308 while running on the corresponding corner.

In the case where a trouble or failure of engine 305 occurs; a flow proceeds as step S1→step S2→step S3 in the flowchart of FIG. 2. In this case, the driving-force distribution control is prohibited. Namely, the controller prohibits the output limitation of second motor 308, and limits the output of first motor 303 to equal to 0.

[Operations and effects of driving-Force Distribution Control]

Variation characteristics of turning radius R, the engine state, a ratio between total torque of front wheels and total torque of rear wheels, and a ratio between torque of left-rear wheel and torque of right-rear wheel will now be explained, with reference to a time chart of FIG. 6. In one example shown in FIG. 6, the vehicle starts a left turn at time point t1 from in a straight running state, and reaches a (turning) state having a minimum turning radius at time point t3, and then shifts from in the left turning state to in the straight running state between time point t3 and time point t4, in a normal condition where the remaining energy amount of battery 301 is sufficient and engine 305 works properly (i.e., the engine state is proper). Namely in detail, the vehicle starts to turn to the left at time point t1, and reaches a point at which the corner has the minimum turning radius at time point t3, and then becomes in the straight running state by taking the period between time point t3 and time point t4.

In such an example, in the total torque ratio between front wheels and rear wheels, the torque distribution for front wheels gradually decreases and the torque distribution for rear wheels gradually increases, during the period between time point t1 and time point t3. Then, the torque distribution for front wheels gradually increases and the torque distribution for rear wheels gradually decreases, during the period between time point t3 and time point t4. Namely, the driving-force distribution ratio between front and rear wheels varies from a distribution ratio at which much torque is distributed to front wheels side, to a distribution ratio at which higher torque is distributed to rear wheels side as turning radius R becomes smaller. In steer characteristic, when the vehicle enters the corner in front-wheel-drive state, an understeer tendency is caused by suppressing a generation of lateral force due to the excessive driving force of front wheels. However, since the torque distribution for rear wheels side is increased after the vehicle's entrance into the corner, the understeer tendency is relieved (loosened). Thereby, a weak understeer state (characteristic) can be achieved.

Moreover in the torque ratio between left-rear wheel and right-rear wheel; the torque distribution for the left-rear wheel serving as a turning-inner wheel gradually decreases, and the torque distribution for the right-rear wheel serving as a turning-outer wheel gradually increases, during the period between time point t1 and time point t3. Then, the torque distribution for left-rear wheel gradually increases and the torque distribution for right-rear wheel gradually decreases, during the period between time point t3 and time point t4. Namely, the driving-force distribution ratio between left-rear wheel and right-rear wheel starts at 1:1 in the time chart of FIG. 6. Then, torque (or driving force) is distributed (or divided) to the turning-outer wheel in a greater degree as turning radius R becomes smaller. Hence in the steer characteristic of turning behavior, when the vehicle enters the corner with the torque distribution ratio of left-rear wheel to right-rear wheel being equal half (1:1), an oversteer moment is not caused. However, since the torque distribution for turning-outer wheel is increased after the vehicle's entrance into the corner, the oversteer moment is produced. Thereby, the weak understeer state (characteristic) is relieved, the neutral steer state can be achieved. Thus, while the vehicle is turning, the neutral steer providing high running and operation stability can be achieved, by carrying out the driving-force distribution control for front-to-rear and left-to-right of rear wheel, which includes the output control for engine 305, first motor 303 and second motor 308 and the distribution ratio control for differential mechanism 309.

Figure 7:
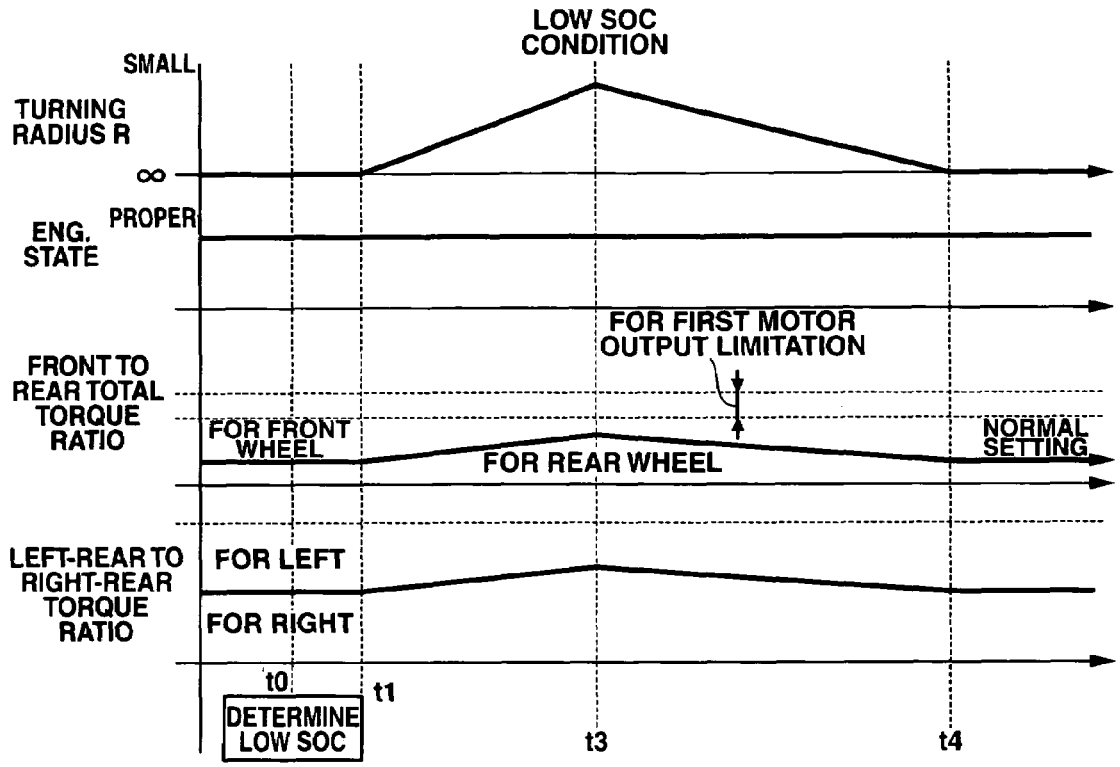
FIG. 7 is a time chart showing respective variation characteristics of the turning radius, the engine state, the ratio between total torque of front wheels and total torque of rear wheels, and the ratio between left-rear wheel torque and right-rear wheel torque, in the case of a low SOC condition.

Variation characteristics of turning radius R, the engine state, the ratio between total torque of front wheels and total torque of rear wheels, and the ratio between torque of left-rear wheel and torque of right-rear wheel at the time of a low SOC, will now be explained with reference to a time chart of FIG. 7. In one example shown in FIG. 7, the SOC is judged to be low at time point to at which the vehicle is running straight, and the vehicle starts a left turn at time point t1 and reaches a (turning) state having a minimum turning radius at time point t3 and then shifts from in the left turning state to in the straight running state between time point t3 and time point t4, in the low SOC condition where the remaining energy amount of battery 301 is insufficient and engine 305 is working properly.

Figure 6:
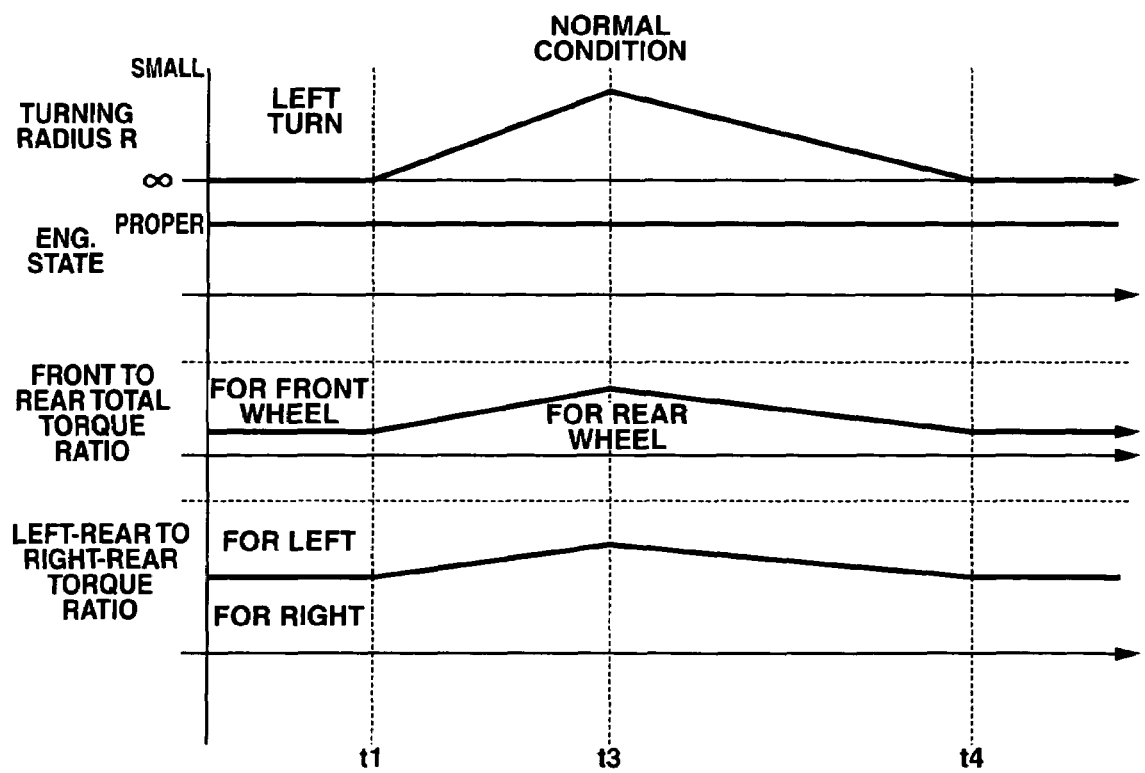
FIG. 6 is a time chart showing respective variation characteristics of a turning radius, an engine state, a ratio between total torque of front wheels and total torque of rear wheels, and a ratio between left-rear wheel torque and right-rear wheel torque, in the case of a normal condition.

In such an example, the total torque of four wheels is reduced by limitation amount of the output to first motor 303, however the total torque ratio between front wheels and rear wheels maintains the same ratio as in the normal condition of FIG. 6. In the total torque ratio between front wheels and rear wheels, the torque distribution for front wheels gradually decreases and the torque distribution for rear wheels gradually increases, during the period between time point t1 and time point t3. Then, the torque distribution for front wheels gradually increases and the torque distribution for rear wheels gradually decreases, during the period between time point t3 and time point t4. Namely, the driving-force distribution ratio between front wheels and rear wheels varies from a distribution ratio at which much torque is distributed to front wheels side, to a distribution ratio at which higher torque is distributed to rear wheels side as turning radius R becomes smaller. In steer characteristic, when the vehicle enters the corner in front-wheel-drive state, an understeer tendency is caused by suppressing the generation of lateral force due to the excessive driving force of front wheels. However, since the torque distribution for rear wheels side is increased after the vehicle's entrance into the corner, the understeer tendency is relieved (loosened). Thereby, a weak understeer state can be achieved.

Moreover, the total torque for rear wheels is not limited (is not given the output limitation). In the torque ratio between left-rear wheel and right-rear wheel, the torque distribution for the left-rear wheel serving as a turning-inner wheel gradually decreases, and the torque distribution for the right-rear wheel serving as a turning-outer wheel gradually increases, during the period between time point t1 and time point t3, in the similar manner as the normal condition of FIG. 6. Then, the torque distribution for left-rear wheel gradually increases and the torque distribution for right-rear wheel gradually decreases, during the period between time point t3 and time point t4. Namely, the driving-force distribution ratio between left-rear wheel and right-rear wheel starts at 1:1 in the time chart of FIG. 7. Then, torque (or driving force) is distributed to the turning-outer wheel in a greater degree as turning radius R becomes smaller. Hence in the steer characteristic of turning behavior, when the vehicle enters the corner with the torque distribution ratio of left-rear wheel to right-rear wheel being equal half (1:1), the oversteer moment is not caused. However, since the torque distribution for turning-outer wheel is increased after the vehicle's entrance into the corner, the oversteer moment is caused. Thereby, the weak understeer state is relieved, the neutral steer state (characteristic) can be achieved. Thus, in the case of low SOC, the high running and operation stability of the vehicle can be secured, by limiting the output of only first motor 303 and thereby assuring the driving-force distribution control for front-to-rear and the driving-force distribution control for left-to-right of rear-wheel in the same manner as the normal condition.

Figure 8:
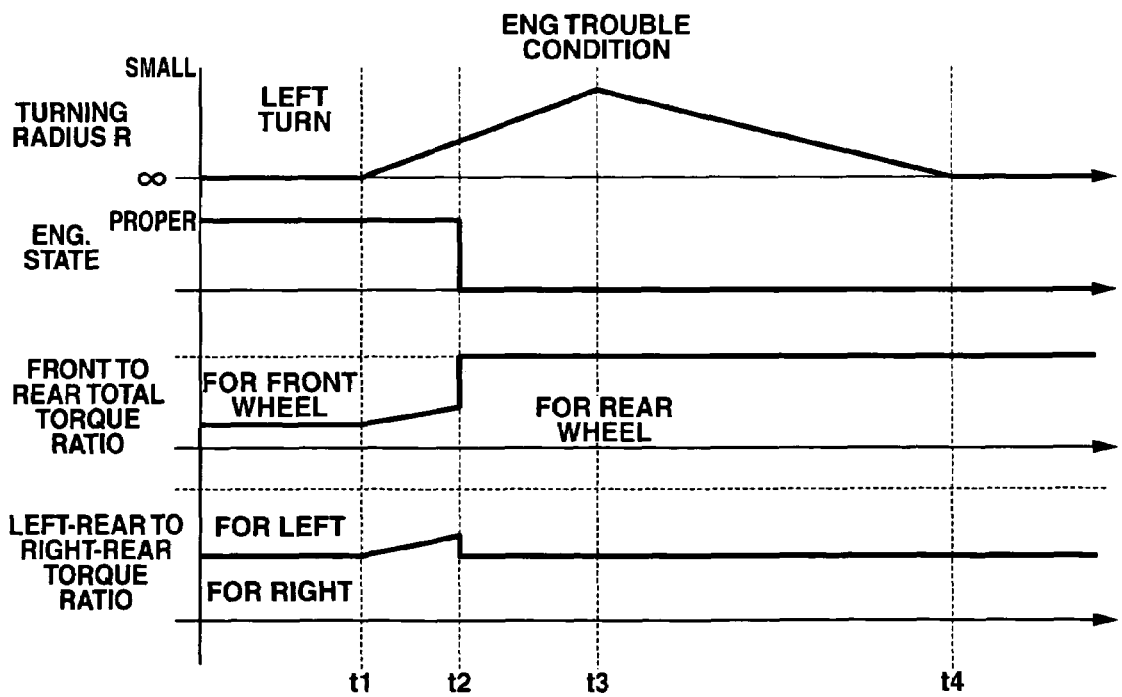
FIG. 8 is a time chart showing respective variation characteristics of the turning radius, the engine state, the ratio between total torque of front wheels and total torque of rear wheels, and the ratio between left-rear wheel torque and right-rear wheel torque, in the case of an engine trouble.

Variation characteristics of turning radius R. the engine state, the ratio between total torque of front wheels and total torque of rear wheels, and the ratio between torque of left-rear wheel and torque of right-rear wheel at the time of engine trouble (failure), will now be explained with reference to a time chart of FIG. 8. In the example shown in FIG. 8, the vehicle starts a left turn at time point t1, from in a straight running state where the remaining energy amount of battery 301 is sufficient and engine 305 is working normally (the engine state is proper). Then, an engine trouble is detected (determined) at time point t2. Then, the vehicle reaches a (turning) state having a minimum turning radius at time point t3, and shifts from in the left turning state to in the straight running state during the period between time point t3 and time point t4.

In this case, in the total torque ratio between front wheels and rear wheels; the torque distribution for front wheels gradually decreases and the torque distribution for rear wheels gradually increases, during the period between time point t1 and time point t2. However, the torque distribution for front wheels to be produced by engine 305 and first motor 303 is made (set) to zero at time point t2 at which the engine trouble is detected. After time point t2, the torque distribution for rear wheels accounts for 100% of all distribution torque for four wheels. Namely, the vehicle changes from a four-wheel-drive vehicle using front wheels as main drive wheels (i.e., a four-wheel-drive vehicle based on front-wheel-drive vehicle) to a rear-wheel-drive vehicle using only second motor 308 as a drive source.

Moreover in the torque ratio between left-rear wheel and right-rear wheel; the torque distribution for the left-rear wheel serving as a turning-inner wheel gradually decreases, and the torque distribution for the right-rear wheel serving as a turning-outer wheel gradually increases, during the period between time point t1 and time point t2. However, the driving-force distribution control for left-to-right is prohibited at time point t2 at which the engine trouble occurs, and then the driving-force distribution ratio between left-rear wheel and right-rear wheel becomes 1:1. Namely, torque is equally distributed to the left-rear wheel and right-rear wheel after time point t2.

Therefore, in the turning behavior; a behavior caused by the driving-force distribution control of the normal condition occurs from time point t1 at which the vehicle enters the corner to time point t2 at which the engine trouble is determined. At the time of the engine trouble, the driving-force distribution control of the normal condition is changed to a control for causing the vehicle to run by using only the currently remaining energy of battery 301 (rear-wheel-drive vehicle using only second motor 308 as a drive source). Thereby, the vehicle can move to a safety area by keeping running although engine 305 is in a fault state.

Next, the configurations and advantages of the driving-force distribution control apparatus for a vehicle in the first embodiment will now be described.

(1) The driving-force distribution control apparatus for a vehicle, includes first motor 303 adapted to drive one main drive wheels of the front wheels and rear wheels; second motor 308 adapted to drive another auxiliary drive wheels of the front wheels and the rear wheels; engine 305 adapted to drive at least one of the front wheels and the rear wheels; battery 301 connected electrically with first motor 303 and second motor 308; the upper-limit output setting section configured to set the upper limit output of battery 301 in accordance with the charge state of battery 301; and the driving-force distribution control section. This driving-force distribution control section is configured to control the output of first motor 303 and the output of second motor 308 in accordance with the running condition of the vehicle, to bring the steer characteristic of vehicle closer to the neutral steer, and configured to impose the output limitation on only first motor 303 between first motor 303 and second motor 308 when the desired total output of first motor 303 and second motor 308 becomes greater than the upper limit output of battery 301. Thus, the output limitation is imposed to only first motor 303, not equally to first motor 303 and second motor 308. Therefore, even when the vehicle is turning under the condition where the total output power of two motors exceeds an upper-limit output power of the battery, the high running and operation stability of the vehicle can be secured by continuing the torque production of second motor 308 and thereby assuring the driving-force distribution control.

(2) The driving-force distribution control apparatus for a vehicle, further includes differential mechanism 309 (driving-force dividing mechanism) connected with the auxiliary drive wheels and capable of distributing driving force between the left wheel and the right wheel of the auxiliary drive wheels at a substantially arbitrary distribution ratio. Then, the driving-force distribution control section is configured to carry out the front-to-rear driving-force distribution control by distributing driving force between the main drive wheels and the auxiliary drive wheels by using the first and second motors, and configured to carry out the left-to-right driving-force distribution control by distributing driving force between the left wheel and the right wheel of the auxiliary drive wheels by using differential mechanism 309, so as to bring the steer characteristic closer to the neutral steer. Hence, the reduction of driving force of the turning-outer wheel of auxiliary drive wheels which is needed to achieve the neutral steer, can be suppressed.

(3) In the driving-force distribution control apparatus for a vehicle, the driving-force distribution control section includes the engine output correcting section (step S9) configured to increase the output of engine 305 to compensate for the output reduction of first motor 303 due to the output limitation while the driving-force distribution control section is imposing the output limitation on first motor 303. Accordingly, engine 305 covers the shortage of desired torque for front wheel side due to the output reduction of first motor 303 caused by the output limitation imposed by the front-to-rear driving force control. Therefore, the high running and operation stability of the vehicle can be secured by the production of desired (target) distribution driving forces for the front and rear.

(4) In the driving-force distribution control apparatus for a vehicle, the engine output correcting section is configured to correctively increase the engine output to allow first motor 303 to generate an electric power corresponding to the difference between the output of second motor 308 and the upper limit output of battery 301, when the desired output of second motor 308 becomes greater than the upper limit output of battery 301 in the case where only second motor 308 between first motor 303 and second motor 308 does a power running as the result of the output limitation on first motor 303 (steps S10 and 11). Hence, even if the remaining capacity of battery 301 is low and thereby the output power of second motor 308 exceeds the upper-limit output power of battery 301, second motor 308 can continuously produce and output the no-shortage torque with a high energy efficiency. Namely, the no-shortage torque output from second motor 308 can be continuously secured under the condition where a drive system of the vehicle is working with a high energy efficiency.

(5) The driving-force distribution control apparatus for a vehicle, further includes the topography information gathering section configured to gather the topography information. Then, the driving-force distribution control section is configured to calculate the continuous output possible power for second motor 308 in accordance with the vehicle speed, the upper limit output of battery 301, and the continuation distance of a corner calculated from the topography information (derived from GPS 405), and configured to output the command for producing the continuous output possible power to second motor 308, when the desired output of second motor 308 is smaller than or equal to the upper limit output of battery 301 in the case where only second motor 308 between first motor 303 and second motor 308 does the power running as the result of the output limitation on first motor 303 (steps S13-17). Hence, the driving-force distribution control can be continued by torque output of second motor 308, while effectively availing battery 301.

(6) In the driving-force distribution control apparatus for a vehicle, the driving-force distribution control section includes the driving-force distribution control prohibiting section configured to limit the output of first motor 303 to substantially equal to 0 and prohibit the output limitation for second motor 308, when the trouble of engine 305 occurs (step S9). Hence, the vehicle can move to a safety area by allowing the driving-force distribution control to become a control for causing the vehicle to run by using only the currently remaining energy of battery 301.

(7) In the driving-force distribution control apparatus for a vehicle, the upper-limit output setting section is configured to set the upper limit output of battery 301 on the basis of the battery temperature and the charge state of the battery. Hence, the drive system of the vehicle can be operated with a performance and an operating life of battery 301 taken into account.

Second Embodiment

A configuration of a second embodiment according to the present invention will now be explained. In the second embodiment; the corners to which the driving-force distribution control will be applied are prioritized after imposing the output limitation on first motor 303, in the case where the remaining amount of liquid fuel is small as the result of checking the remaining amount of liquid fuel.

S1nce a system configuration in the second embodiment is substantially same as the first embodiment as shown in FIG. 1 except for the following process to be executed in CPU 101, the similar explanations as the first embodiment and a drawing of the configuration of second embodiment will be omitted. Namely in CPU 101, the topography information is gathered by GPS 405; the remaining amount of liquid within fuel tank 406 and a driving route information including the estimated friction coefficient of road surface, the tuning degree (turning radius) and a gradient degree are ascertained; and thereby the corners applicable to the control are selected.

Next, operations in the second embodiment will now be explained.

[Process of Driving-Force Distribution Control]

Figure 9:
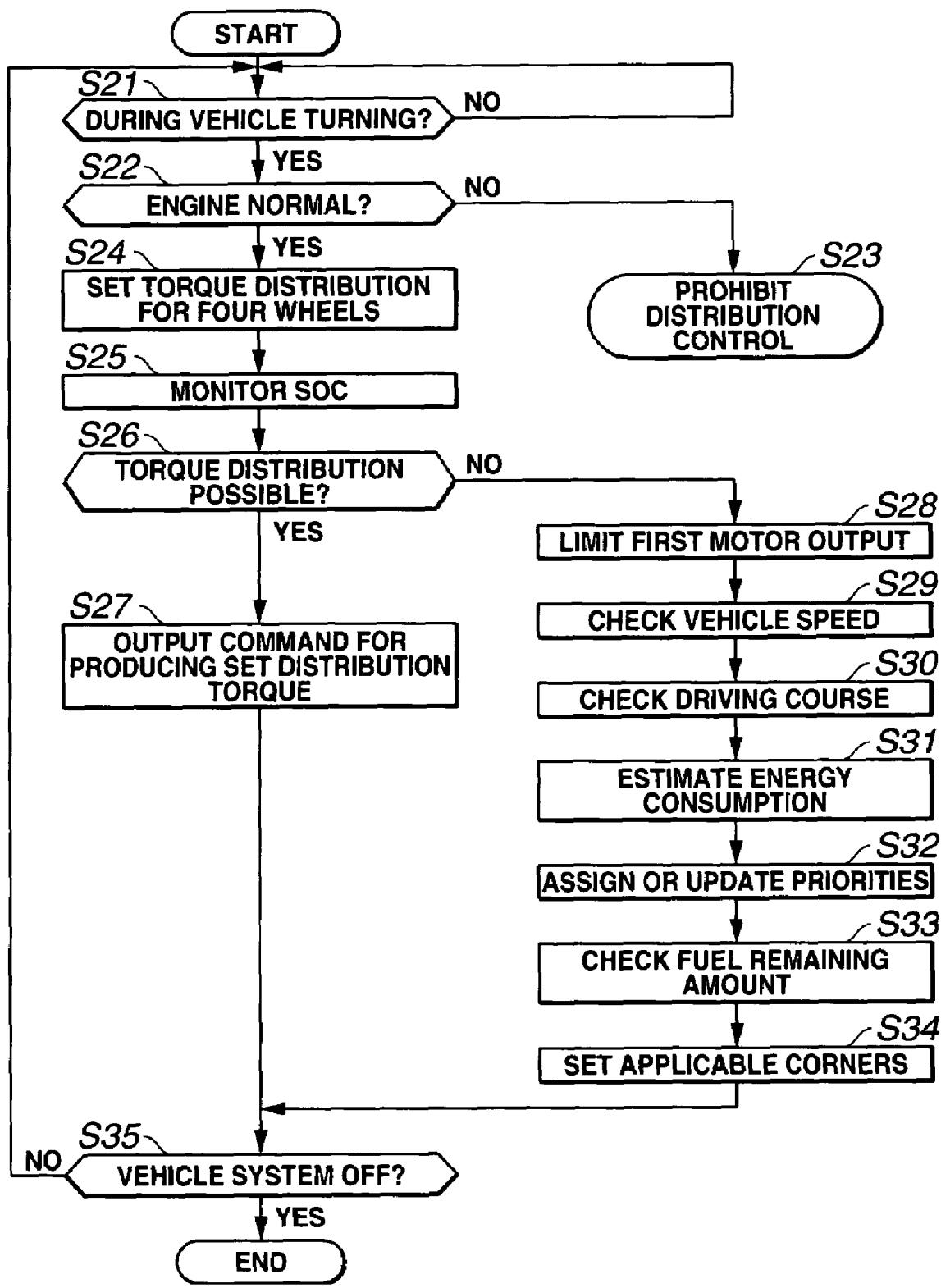
FIG. 9 is a flowchart showing a control process of driving-force distribution control which is executed in the CPU in a second embodiment according to the present invention.

FIG. 9 is a flowchart showing a process of the distribution control of driving force which is executed in CPU 101 in the second embodiment. Respective steps (the driving-force distribution control section) of this flowchart will now be explained. Since steps S21-S28 respectively correspond to steps S1-S8 of the flowchart shown in FIG. 2 in the first embodiment, the similar explanations as the first embodiment will be omitted.

At step S29 subsequent to the output limitation of first motor 303 at step S28, the controller (CPU 101) checks or detects the vehicle speed by sensing the rotation speed of first motor 303. Then, the program proceeds to step S30.

At step S30 subsequent to the check of vehicle speed of step S29, the controller checks the driving course (route) set in GPS 405, especially checks the information of corners scheduled to be passed by the vehicle. Then, the program proceeds to step S31.

At step S31 subsequent to the check of the driving course setting at step S30, the controller calculates or estimates an amount of liquid fuel necessary to run (drive) along all the set driving course at a legally prescribed vehicle speed, and an additional amount of liquid fuel (consumption) to be consumed at each corner according to the torque increase of rear wheels. Then, the program proceeds to step S32. When calculating the liquid fuel amount, a conversion formula is used on the basis of consumption-energy estimation maps shown in FIGS. 10~13. The calculation of the additional liquid fuel amount (i.e., increased amount of liquid fuel consumption) according to the torque increase of rear wheels will be explained later.

At step S32 subsequent to the estimation of energy consumption at step S31, the controller prioritizes the corners scheduled to be passed which are checked at step S30, in order to apply torque increase(up) of rear wheels. In other words, the controller assigns priorities to the corners determined at step S30, in order to determine the distribution torque of rear wheels. It is noted that step S32 corresponds to a corner prioritization section according to the present invention. Then, the program proceeds to step S33.

At step S33 subsequent to the priority setting or update at step S32, the controller checks or detects the remaining amount of liquid fuel within fuel tank 406. It is noted that step S33 corresponds to a fuel remaining amount detecting section. Then, the program proceeds to step S34.

At step S34 subsequent to the check of the remaining amount of fuel at step S33, the controller sets the corners applicable to the torque increase of rear wheels, with reference to the results of the priority setting for applying the torque increase of rear wheels at step S32, the check of the remaining amount of liquid fuel at step S33, and the estimation of energy consumption at step S31. Thus, the controller carries out the calculated torque (driving-force) distribution only at the set applicable corners. Then, the program proceeds to step S35. More specifically, at step S34, the controller basically does not carry out the torque-up control of rear wheels at all, in the case of the corner having a low priority. In other words, the controller prohibits the front-to-rear driving-force distribution control (or, both of the front-to-rear driving-force distribution control and the left-to-right driving-force distribution control) carried out to bring the steer characteristic closer to the neutral steer, when the vehicle runs at a corner having the assigned low priority. However, the controller may be configured to enlarge the number of the applicable corners as much as possible by limiting a degree of torque increase of rear wheels. The process of toque limitation in the case of the low priority corner will now be described. The controller (CPU 101) executes the calculations of following values.

(a) The remaining amount of liquid fuel within fuel tank 406

(b) The estimated amount of liquid fuel consumption necessary for the straight-ahead driving on the driving course (c) The estimated amount of liquid fuel consumption at a MUST corner(s) applicable to the torque increase of rear wheels (d) The estimated amount of liquid fuel consumption at a WANT corner(s) applicable to the torque increase of rear wheels (e) Margin quantity Torque upper-limit correction factor=$\{(a)-((b)+(c))\}/(e)/(d)$ This torque upper-limit correction factor is multiplied by the torque increase setting of rear wheels (i.e., increased distribution torque for the rear) at the WANT corner. It is noted that, the process explained in the case where the battery SOC is insufficient to produce first and second motor torques in the first embodiment may be employed in the case of the low priority corner in this second embodiment. Namely, the controller may be configured to maintain the output of second motor 308 at the determined level, and configured to limit the output of first motor 303 and correctively increase the output of engine 305 so as to compensate for a shortage due to this output limitation of first motor 303.

At step S35 subsequent to step S27 or S34, the controller judges whether or not a vehicle system e.g., an ignition key is in an OFF state. If the answer of step S35 is YES, the program proceeds to the end. If the answer of step S35 is NO, the program returns to step S21.

[Calculation of Increased Amount of Liquid Fuel Consumption]

Now, the method of calculating the increased amount of liquid fuel consumption according to the torque increase of rear wheels, at step S31 will be explained. Specifically, the controller calculates correction factors in accordance with the maps shown in FIGS. 10 to 13, and estimates the increased amount of liquid fuel consumption by using this correction factors.

Figure 10:
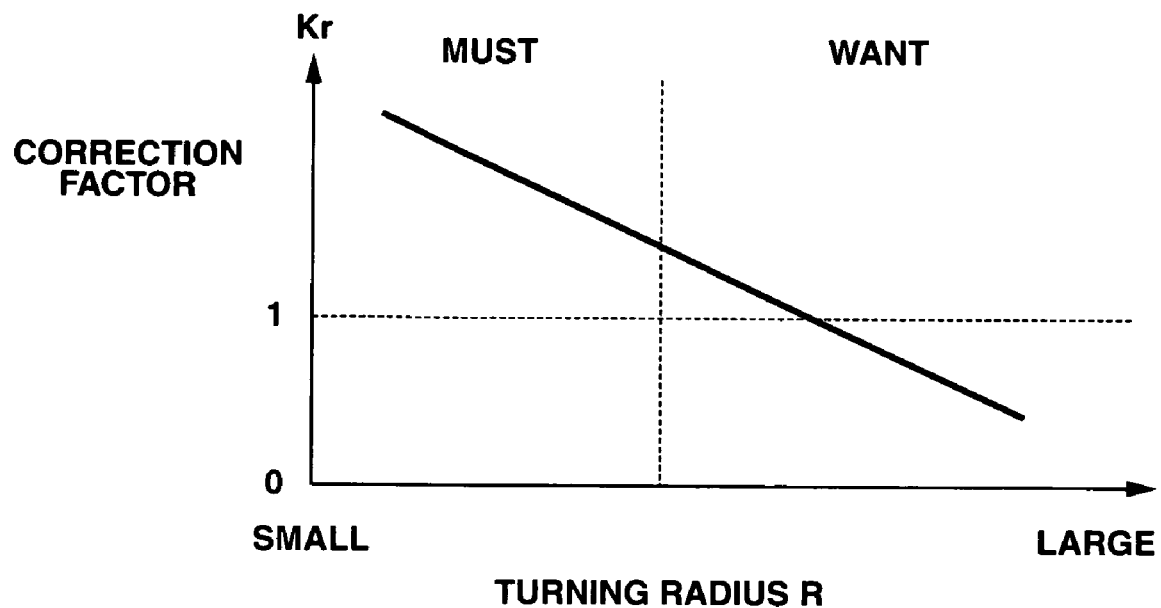
FIG. 10 is a view showing one example of consumption correction factor setting map relative to the turning radius, which is used in the second embodiment.

FIG. 10 is a map showing a consumption correction factor Kr according to turning radius R. In FIG. 10, correction factor Kr is provided to become a smaller value as turning radius R becomes greater. This is since the execution of the torque increase (up) of the rear becomes more necessary in order to achieve the stable running as turning radius R becomes smaller. Accordingly, a MUST region is defined in the smaller side of turning radius R in FIG. 10. Namely this map is set as above, since the degree of torque increase of rear wheels is made greater as turning radius R becomes smaller. This is because the increase of running course due to the difference between turning-radiuses formed by the inner front wheel and the inner rear wheel becomes greater as turning radius R becomes smaller.

Figure 11:
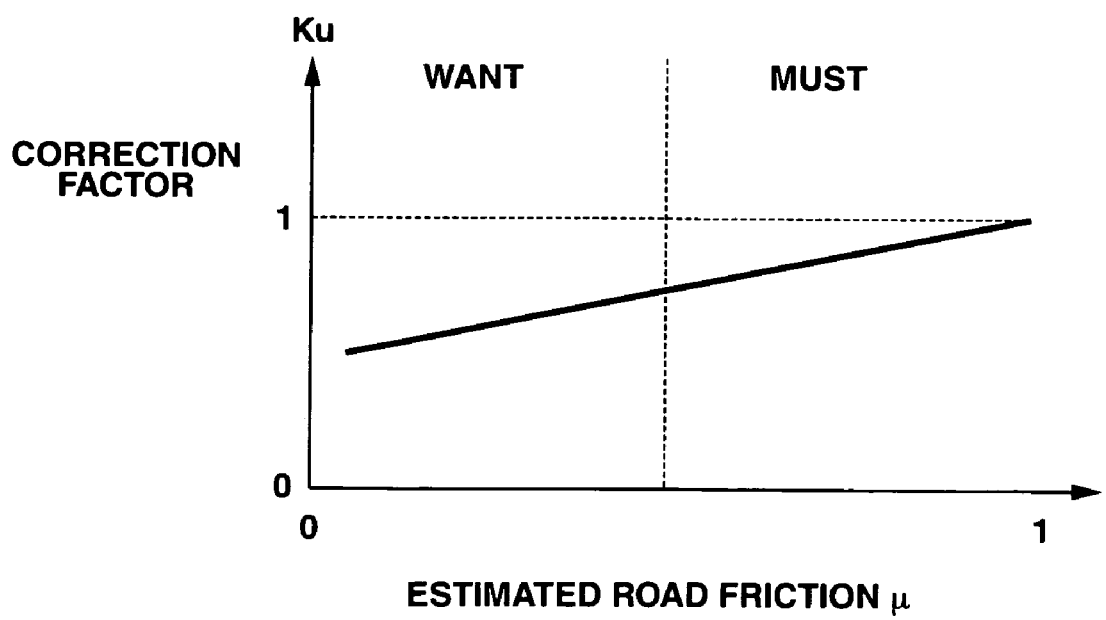
FIG. 11 is a view showing one example of consumption correction factor setting map relative to an estimated road friction coefficient, which is used in the second embodiment.

FIG. 11 is a map showing a consumption correction factor Kμ according to an estimated road friction coefficient μ. In FIG. 11, correction factor Kμ is provided to become a greater value as estimated road friction coefficient p becomes greater. This is since the execution of the torque increase(up) of rear wheels becomes more necessary in order to achieve the stable running as estimated road friction coefficient μ becomes greater. Accordingly, a MUST region is defined in the greater side of estimated road friction coefficient μ in FIG. 11. Namely this map is set as above, since the degree of torque increase of the rear is made lower as estimated road friction coefficient μ becomes smaller. This is because a torque response needs to become more severe (simpler) as estimated road friction coefficient μ becomes smaller.

Figure 12:
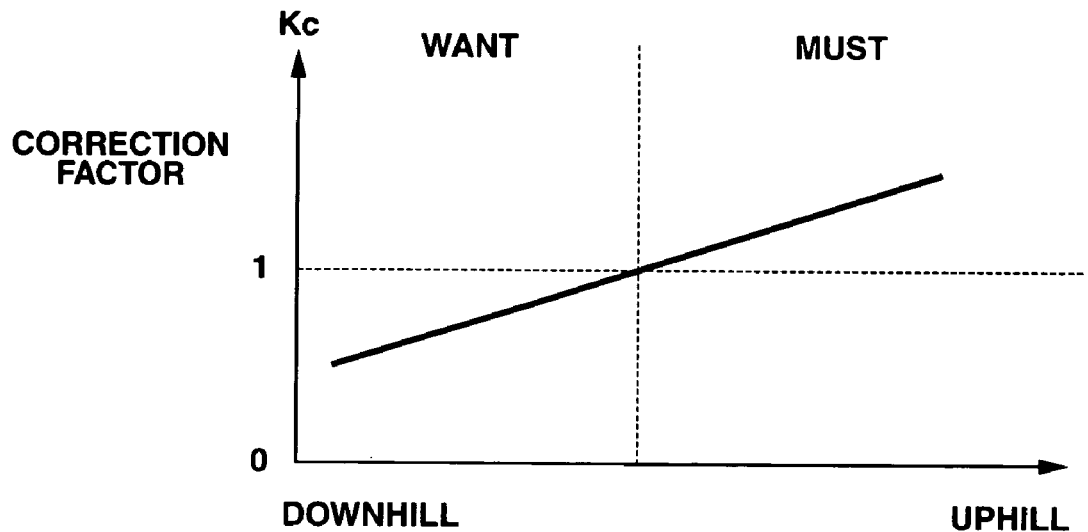
FIG. 12 is a view showing one example of consumption correction factor setting map relative to a gradient degree, which is used in the second embodiment.

FIG. 12 is a map showing a consumption correction factor Kc according to the gradient degree. In FIG. 12, correction factor Kc is provided to become a greater value as the gradient degree becomes greater (namely, an up-hill). The execution of the torque increase of rear wheels becomes more necessary in order to achieve the stable running as the gradient degree becomes greater, since a cornering force of front wheels is more reduced as the gradient degree becomes greater. Accordingly, a MUST region is defined in the greater side of the gradient degree in FIG. 12. Namely this map is set as above, since the degree of torque increase of the rear is made greater as the gradient degree becomes greater (uphill). This is also since a total torque necessary for the vehicle becomes higher as the gradient degree becomes greater, and accordingly the torque increase of the rear needs to be enhanced.

Figure 13:
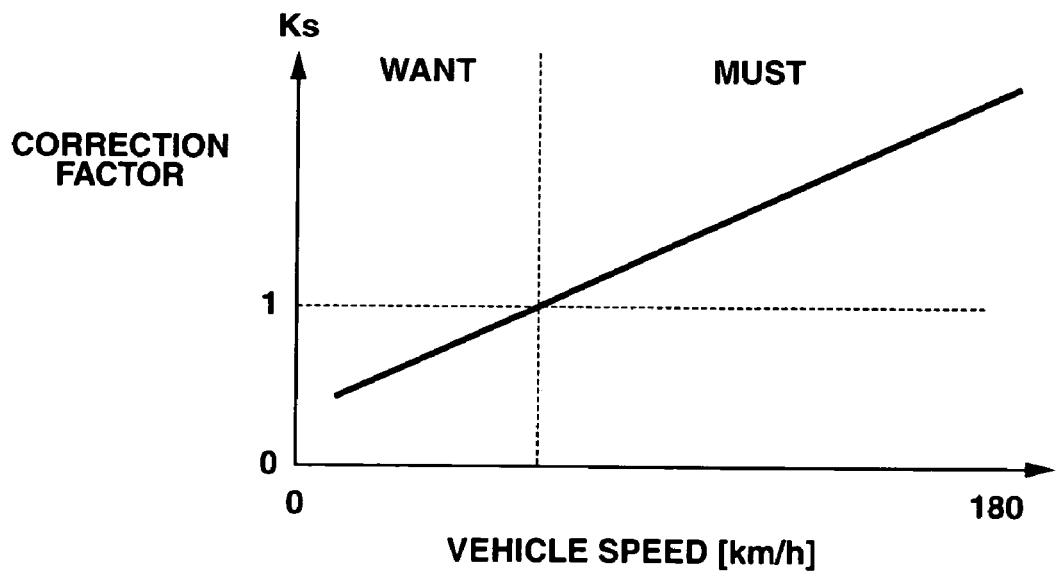
FIG. 13 is a view showing one example of consumption correction factor setting map relative to a turning speed of the vehicle, which is used in the second embodiment.

FIG. 13 is a map showing a consumption correction factor Ks according to the vehicle speed. In FIG. 13, correction factor Ks is provided to become a greater value as the vehicle turning speed becomes higher. This is since the execution of the torque increase of the rear becomes more necessary in order to achieve the stable running as the turning speed becomes higher. Accordingly, a MUST region is defined in the higher side of turning speed in FIG. 13. Namely this map is set as above, since the degree of torque increase of rear wheels is made greater as the turning speed becomes higher.

Therefore, the increased amount of liquid fuel consumption is calculated with reference to the following formula.

Increased amount of liquid fuel consumption=Average fuel consumption×Running distance of corner× Kr×Kμ×Kc×Ks

[Operations and Effects of Driving-Force]Distribution Control

In the case where the vehicle is turning, engine 305 is properly operating, and the desired torque distribution cannot be realized; a flow proceeds as step S21→step S22→step S24→step S25→step S26→21step S28→step S29→step S30→step S31→step S32→step S33→step S34 in the flowchart of FIG. 9.

Hence, if the remaining quantity of liquid fuel for engine 305 is small, the corners to which the driving-force distribution control will be applied are prioritized. Further if the priority for applying the driving-force distribution control is low, the torque-up control of rear wheels is basically not carried out, In other words, the driving-force distribution control is basically prohibited at a corner having the low priority. Therefore, the vehicle can certainly reach a destination since the increase of fuel consumption can be suppressed.

Such a prioritization is performed in accordance with [a] turning radius R, [b] estimated road friction coefficient μ, [c] the gradient degree of uphill (ascent degree), and [d] the vehicle speed. Namely, the priority of each corner is set by considering that how small turning radius R is, how large estimated road friction coefficient μis, how large the gradient degree of uphill is, and how high the vehicle speed is. Thus, the torque increase control of rear wheels according to the driving-force distribution control is carried out in the situation where the understeer is easy to occur. Therefore, the high running and operation stability of the vehicle can be secured.

Moreover in another configuration, if the remaining quantity of liquid fuel for engine 305 is small, the corners to which the driving-force distribution control will be applied are prioritized. Then at a corner having the low priority for applying the driving-force distribution control; the output of second motor 308 is maintained at the determined level, the output of first motor 303 is limited, and the output of engine 305 is correctively increased so as to cover a shortage due to this output limitation of first motor 303. Hence, the balance between the front and rear of vehicle can be kept while reducing the energy consumption. Therefore, a high turning performance can be secured.

Next, the configurations and advantages of the driving-force distribution control apparatus for a vehicle in the second embodiment will now be described. In the second embodiment, the following effects can be obtained in addition to the effects (1) and (2) described in the first embodiment.

(8) The driving-force distribution control apparatus for a vehicle, further includes the fuel remaining amount detecting section configured to detect the remaining amount of liquid fuel for engine 305 (step S33). Then, the driving-force distribution control section includes the corner prioritization section configured to prioritize corners scheduled to be passed by the vehicle, when the detected remaining amount of liquid fuel is smaller than the determined amount (i.e., is insufficient to reach the destination). Moreover the driving-force distribution control section includes the driving-force distribution control prohibiting section configured to prohibit the front-to-rear driving-force distribution control carried out to bring the steer characteristic closer to the neutral steer, when the vehicle runs at a corner having a low priority assigned by the corner prioritization section (step S34). Hence, the vehicle can certainly reach a predetermined destination since the increase of fuel consumption can be suppressed.

(9) In the driving-force distribution control apparatus for a vehicle, the corner prioritization section is configured to assign a higher priority to a corner among the corners scheduled to be passed by the vehicle, as the vehicle speed becomes higher, as the turning radius of the corresponding corner becomes smaller, as the estimated road friction coefficient of the corresponding corner becomes greater, and as the gradient degree of the corresponding corner becomes greater. Thus, in a vehicle using front wheels as main drive wheels, the torque-up of rear wheels is carried out by applying the driving-force distribution control in the situation where the understeer is easy to occur. Therefore, the high running and operation stability of the vehicle can be secured.

(10) The driving-force distribution control apparatus for a vehicle, further includes the fuel remaining amount detecting section configured to detect the remaining amount of liquid fuel for engine 305 (step S33), and the driving-force distribution control section includes the corner prioritization section configured to prioritize corners scheduled to be passed by the vehicle, when the detected remaining amount of liquid fuel is smaller than a determined amount. Then, the driving-force distribution control section imposes the output limitation on only first motor 303 between first motor 303 and second motor 308, and the engine output correcting section correctively increases the output of engine 305 to compensate for the output reduction of first motor 303 due to the output limitation, when the vehicle runs a corner having the low priority assigned by the corner prioritization section (step S34). Hence, the balance between the front and rear of vehicle can be kept, while reducing the energy consumption. Therefore, a high turning performance can be secured.

Third Embodiment

In a third embodiment according to the present invention; the driving-force distribution control for rear left and right wheels is carried out, by driving each of the rear left and right wheels by means of a corresponding motor.

Figure 14:
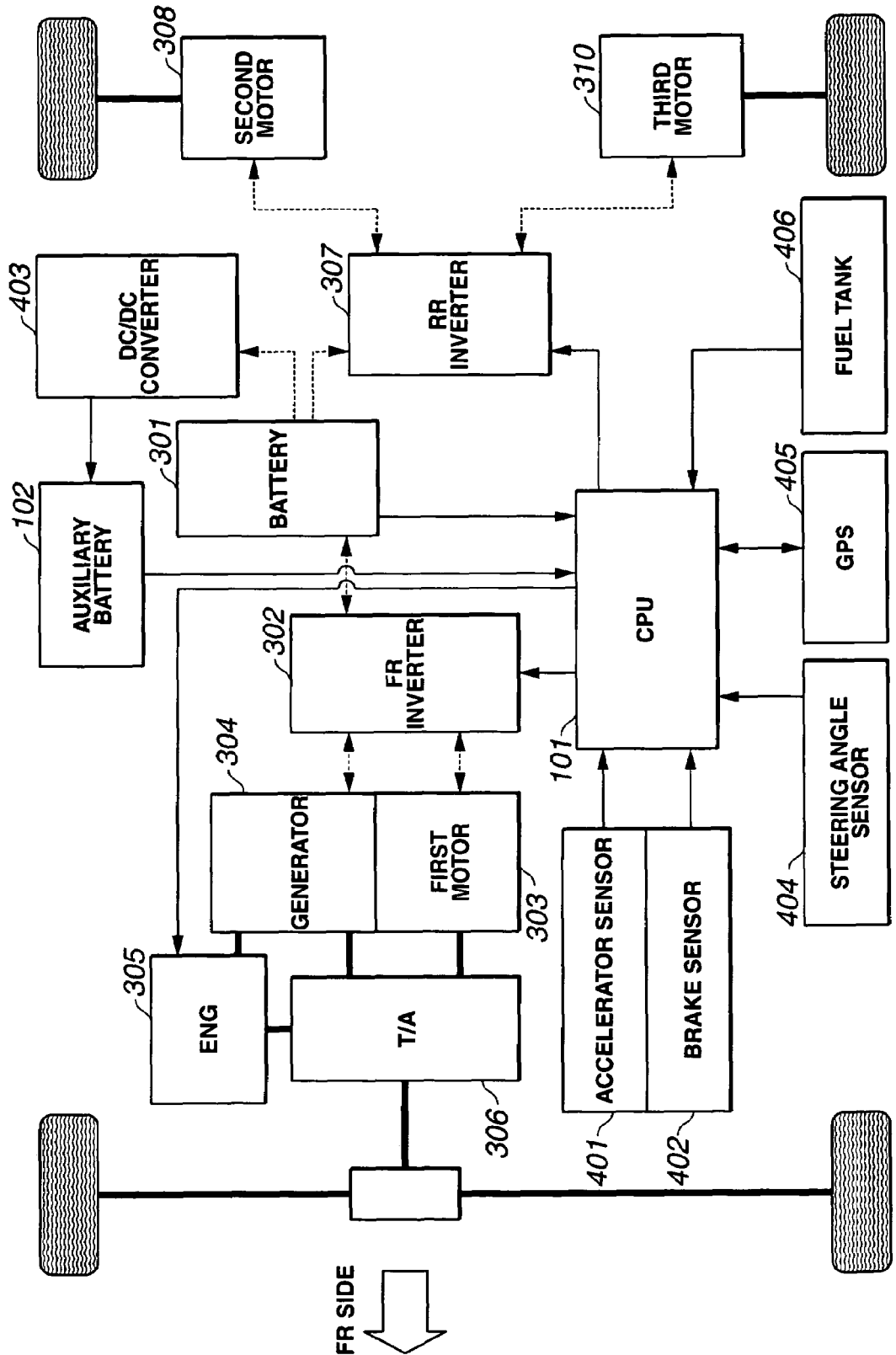
FIG. 14 is a schematic block diagram showing a system configuration of hybrid four-wheel-drive vehicle employing a driving-force distribution control apparatus of a third embodiment according to the present invention.

At first, a configuration of the third embodiment will now be explained. FIG. 14 is a schematic block diagram showing a hybrid four-wheel-drive vehicle employing a driving-force distribution control apparatus of the third embodiment. The hybrid four-wheel-drive vehicle in the third embodiment includes CPU (central processing unit) 101, auxiliary battery 102, battery (strong battery or highly chargeable battery) 301, FR inverter 302, first motor(/generator) 303, generator 304, engine 305, power dividing mechanism 306, RR inverter 307, second motor(/generator) 308, a third motor(/generator) 310, accelerator sensor 401, brake sensor 402, DC-DC converter 403, steering angle sensor 404, GPS 405, and fuel tank 406, as shown in FIG. 14. The driving-force dividing mechanism for left and right rear wheels is comprised of second motor 308 and third motor 310 each of which drives the left or right wheel independently. It is noted that the configurations of third embodiment functioning in the same manner as the corresponding configurations of the first embodiment shown in FIG. 1 will be omitted from the explanation.

CPU 101 is configured to operate second motor 308 (for driving the rear right wheel) and third motor 310 (for driving the rear left wheel) by controlling RR inverter 307. Thereby, CPU 101 performs the driving-force distribution control for the left wheel and the right wheel of rear wheels, so as to achieve the neutral steer.

Battery 301 is configured to supply electric power to second motor 308 and third motor 310 via RR inverter 307 so as to give an assistance for the vehicle running, when second motor 308 and third motor 310 do the power running. On the other hand, when second motor 308 and/or third motor 310 generates electric power, battery 301 receives electric power from second motor 308 and/or third motor 310 via RR inverter 307.

Second motor 308 serves to drive the rear-right wheel so as to allow the vehicle to function as a 4 WD vehicle, when the vehicle is in the normal running condition. When the vehicle is turning; second motor 308 produces torque according to the increase of running course due to the difference between turning-radiuses formed by inner front and rear wheels, so as to improve the running and operation stability of the vehicle.

Third motor 310 serves to drive the rear-left wheel so as to allow the vehicle to function as a 4 WD vehicle, when the vehicle is in the normal running condition. When the vehicle is turning; third motor 310 produces torque according to the increase of running course due to the difference between turning-radiuses formed by inner front and rear wheels, so as to improve the running and operation stability. In other words, third motor 310 is adapted to corporate with second motor 308 of the first and second embodiments to drive the auxiliary wheels.

An explanation of operations in the third embodiment will be omitted except the following process. Namely, the torque (limitation) control for the rear is performed by second motor 308, and the optimization control of driving-force distribution between the rear-left wheel and rear-right wheel is performed by differential mechanism 309, in the first and second embodiments. Contrary in this third embodiment, both of the torque limitation control for the rear and the optimization control of driving-force distribution between the rear-left wheel and rear-right wheel are performed by second motor 308 and third motor 310. Only such process and configuration of the third embodiment are different from the first and second embodiments. Moreover, the same effects as that in the first and second embodiments can be obtained according to the third embodiment.

Although the driving-force distribution control apparatus and method for a vehicle according to the present invention have been described above with reference to the first, second and third embodiments, the concrete configuration of the driving-force distribution control apparatus and method is not limited to these embodiments.

For example, in the first, second and third embodiments, the driving-force distribution control apparatus and method according to the present invention have been applied to the hybrid four-wheel-drive vehicle using front wheels as main drive wheels. However, the driving-force distribution control apparatus and method according to the present invention can be also applied to a hybrid four-wheel-drive vehicle using rear wheels as main drive wheels. More specifically, in the case of the hybrid four-wheel-drive vehicle using front wheels as main drive wheels, the driving force of the (turning) outer wheel of the rear is increased in order to suppress the understeer caused due to the excessive driving force of main drive wheels (front wheels). At this time, the (torque) limitation for covering the battery state of shortage is imposed on the first motor (front wheel side) but is not imposed on the second motor (rear wheel side). Hence, the problem that the understeer becomes incapable of being suppressed due to the limitation resulting from the battery state, can be solved. On the other hand, in the case of the hybrid four-wheel-drive vehicle using rear wheels as main drive wheels, the driving force of the (turning) inner wheel of the front is increased in order to suppress the oversteer caused due to the excessive driving force of main drive wheels (rear wheels). At this time, the (torque) limitation for covering the battery state of shortage is imposed on the first motor (rear wheel side) and is not imposed on the second motor (front wheel side). Hence, the problem that the oversteer becomes incapable of being suppressed due to the limitation resulting from the battery state, can be solved.

In the first, second and third embodiments, the driving-force distribution control section performs both of the front-to-rear driving force distribution control and the left-to-right driving force distribution control. However, the driving-force distribution control section according to the present invention may perform only the front-to-rear driving force distribution control or only the left-to-right driving force distribution control. Moreover, the contents of driving-force distribution control according to the present invention are also not limited to the contents described in the first, second and third embodiments. Namely, the target driving-force distribution ratio between front wheels and rear wheels and the target driving-force distribution ratio between left wheel and right wheel may be set by using various previously proposed control information such as vehicle speed information, turning radius information, steering angle information, road friction µ information, and accelerator opening information.

In the first, second and third embodiments, first motor 303 corresponds to first drive means, and second motor 308 and third motor 310 correspond to second drive means according to the present invention.

INDUSTRIAL APPLICABILITY

In the above-described first, second and third embodiments, the driving-force distribution control apparatus and method according to the present invention have been applied to the hybrid four-wheel-drive vehicle using front wheels as main drive wheels. However, the driving-force distribution control apparatus and method according to the present invention are also applicable to the hybrid four-wheel-drive vehicle using rear wheels as main drive wheels, as mentioned above. That is, the present invention is applicable to a vehicle including an engine and a first motor to drive main drive wheels which are one of front wheels and rear wheels, a second motor to drive auxiliary drive wheels which are another of the front wheels and rear wheels, a battery electrically connected with the first motor and second motor, and a driving-force distribution control section to control outputs of the first motor and second motor in accordance with a running condition of the vehicle in order to bring the steer characteristic of the vehicle closer to the neutral steer.

This application is based on prior Japanese Patent Applications No. 2005-061297 filed on Mar. 4, 2005 and No. 2005-308080 filed on Oct. 24, 2005. The entire contents of these Japanese Patent Applications are hereby incorporated by reference.

Although the invention has been described above with reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A driving-force distribution control apparatus for a vehicle, comprising:
    a first motor for driving one of front wheels and rear wheels, as main drive wheels;
    a second motor for driving another of the front wheels and the rear wheels, as auxiliary drive wheels;
    an engine for driving the main drive wheels;
    a battery connected electrically with the first motor and the second motor;
    a driving-force dividing mechanism connected with the auxiliary drive wheels, and configured to distribute driving force between a left wheel and a right wheel of the auxiliary drive wheels at a substantially arbitrary distribution ratio; and
    a processing unit electrically connected to the battery, the first motor, the second motor, and the driving-force dividing mechanism,
    wherein the processing unit is configured to:
        set an upper limit output of the battery in accordance with a charge state of the battery,
        control an output of the first motor and an output of the second motor in accordance with a running condition of the vehicle, to bring a steer characteristic of the vehicle closer to a neutral steer,
        impose an output limitation on only the first motor from between the first motor and the second motor, when a desired total output of the first motor and the second motor becomes greater than the upper limit output of the battery,
        carry out a front-to-rear driving-force distribution control by distributing driving force between the main drive wheels and the auxiliary drive wheels, and
        carry out a left-to-right driving-force distribution control by distributing driving force between the left wheel and the right wheel of the auxiliary drive wheels by using the driving-force dividing mechanism such that the steer characteristic is brought closer to the neutral steer.

2. The driving-force distribution control apparatus as claimed in claim 1, wherein the processing unit is configured to increase an output of the engine to compensate for an output reduction of the first motor due to the output limitation while imposing the output limitation on the first motor.

3. The driving-force distribution control apparatus as claimed in claim 2, wherein the processing unit is configured to increase the engine output to allow the first motor to generate an electric power corresponding to a difference between the output of the second motor and the upper limit output of the battery, when a desired output of the second motor becomes greater than the upper limit output of the battery in the case where only the second motor from between the first motor and the second motor does a power running as a result of the output limitation on the first motor.

4. The driving-force distribution control apparatus as claimed in claim 1, wherein the processing unit is configured to limit the output of the first motor to substantially equal 0 and prohibit an output limitation for the second motor, when engine trouble occurs.

5. The driving-force distribution control apparatus as claimed in claim 1, wherein the processing unit is configured to distribute driving force to only the auxiliary drive wheels when engine trouble occurs.

6. The driving-force distribution control apparatus as claimed in claim 1, wherein the processing unit is configured to set the upper limit output of the battery based on a temperature of the battery and the charge state of the battery.

7. The driving-force distribution control apparatus as claimed in claim 1, wherein the processing unit is configured to:
    detect a remaining amount of liquid fuel for the engine,
    prioritize corners scheduled to be passed by the vehicle, when the detected remaining amount of liquid fuel is smaller than a determined amount, and
    prohibit the front-to-rear driving-force distribution control carried out to bring the steer characteristic closer to the neutral steer, when the vehicle runs at a corner having a low priority assigned by the prioritization of the corners.

8. The driving-force distribution control apparatus as claimed in claim 7, wherein the processing unit is configured to prioritize corners scheduled to be passed by the vehicle, when the detected remaining amount of liquid fuel is insufficient to reach a predetermined destination.

9. The driving-force distribution control apparatus as claimed in claim 7, wherein the processing unit is configured to prohibit both of the front-to-rear driving-force distribution control and the left-to-right driving-force distribution control carried out to bring the steer characteristic closer to the neutral steer, when the vehicle run at the corner having the low priority assigned by the prioritization of the corners.

10. The driving-force distribution control apparatus as claimed in claim 7, wherein the processing unit is configured to prioritize the corners based on a speed of the vehicle, a turning radius of each corner, an estimated road friction coefficient of each corner, and a gradient degree of each corner.

11. The driving-force distribution control apparatus as claimed in claim 10, wherein the processing, unit is configured to assign a higher priority to a corner among the corners scheduled to be passed by the vehicle, as the vehicle speed becomes higher, as the turning radius of the corresponding corner becomes smaller, as the estimated road friction coefficient of the corresponding corner becomes greater, and as the gradient degree of the corresponding corner becomes greater.

12. The driving-force distribution control apparatus as claimed in claim 2, wherein the processing unit is further configured to:
    detect a remaining amount of liquid fuel for the engine,
    prioritize corners scheduled to be passed by the vehicle, when the detected remaining amount of liquid fuel is smaller than a determined amount,
    impose the output limitation on only the first motor from between the first motor and the second motor, and
    correctively increase the output of the engine to compensate for the output reduction of the first motor due to the output limitation, when the vehicle runs a corner having a low priority assigned by the prioritization of the corners.

13. The driving-force distribution control apparatus as claimed in claim 1, further comprising a third motor adapted to cooperate with the second motor to drive the auxiliary drive wheels,
   wherein the battery is connected electrically with the first motor, the second motor, and the third motor, and
   wherein the processing unit is configured to:
      control the output of the first motor, the output of the second motor, and an output of the third motor in accordance with the running condition of the vehicle, to bring the steer characteristic of the vehicle closer to the neutral steer, and
      impose the output limitation on only the first motor from among the first, second, and third motors, when a desired total output of the first, second, and third motors becomes greater than the upper limit output of the battery.

14. The driving-force distribution control apparatus as claimed in claim 13, wherein the processing unit is configured to:
   distribute driving force between the main drive wheels and the auxiliary drive wheels, and
   distribute the driving force distributed for the auxiliary drive wheels between a left wheel and a right wheel of the auxiliary drive wheels by using the second and third motors, so as to bring the steer characteristic closer to the neutral steer.

15. A driving-force distribution control apparatus for a vehicle, comprising:
   a first motor for driving one of front wheels and rear wheels, as main drive wheels;
   a second motor for driving another of the front wheels and the rear wheels, as auxiliary drive wheels;
   an engine for driving the main drive wheels;
   a battery connected electrically with the first motor and the second motor; and
   a processing unit electrically connected to the battery, the first motor, and the second motor,
   wherein the processing unit is configured to:
      set an upper limit output of the battery in accordance with a charge state of the battery,
      control an output of the first motor and an output of the second motor in accordance with a running condition of the vehicle, to bring a steer characteristic of the vehicle closer to a neutral steer,
      impose an output limitation on only the first motor from between the first motor and the second motor, when a desired total output of the first motor and the second motor becomes greater than the upper limit output of the battery, and
      limit the output of the first motor to substantially equal 0 and prohibit an output limitation for the second motor, when engine trouble occurs.

\* \* \* \* \*

UNITED STATES PATENT AND TRADEMARK OFFICE
CERTIFICATE OF CORRECTION

PATENT NO. : 7,591,339 B2  Page 1 of 1
APPLICATION NO. : 11/362013
DATED : September 22, 2009
INVENTOR(S) : Sugimoto et al.

It is certified that error appears in the above-identified patent and that said Letters Patent is hereby corrected as shown below:

On the title page,

[*] Notice: Subject to any disclaimer, the term of this patent is extended or adjusted under 35 USC 154(b) by 413 days Delete the phrase "by 413 days" and insert -- by 620 days --

Signed and Sealed this

Fourth Day of May, 2010

David J. Kappos
*Director of the United States Patent and Trademark Office*